United States Patent [19]

Peyman et al.

[11] Patent Number: 4,705,037

[45] Date of Patent: Nov. 10, 1987

[54] TOPOGRAPHICAL MAPPING, DEPTH MEASUREMENT, AND CUTTING SYSTEMS FOR PERFORMING RADIAL KERATOTOMY AND THE LIKE

[76] Inventors: Gholam A. Peyman, 535 N. Michigan Ave. (Apt. 3001), Chicago, Ill. 60611; James M. Grisolano, Jr., 1004 S. Monitor, Chicago, Ill. 60644

[21] Appl. No.: 699,682

[22] Filed: Feb. 8, 1985

[51] Int. Cl.$^4$ .............................................. A61F 17/32
[52] U.S. Cl. .................................... 128/305; 128/665; 128/745; 351/205; 250/560; 178/18; 340/712
[58] Field of Search ............... 128/305, 660, 665, 745; 356/382, 124; 351/205, 211, 221; 250/560; 178/18; 340/707

[56] References Cited

U.S. PATENT DOCUMENTS

| | | | |
|---|---|---|---|
| 3,761,877 | 9/1973 | Fernald | 178/18 |
| 3,778,157 | 12/1973 | Brebt et al. | |
| 3,792,928 | 2/1974 | Poilleux | |
| 3,944,341 | 3/1976 | Pomerantzeff | |
| 3,997,268 | 12/1976 | Fladda et al. | |
| 4,137,920 | 2/1979 | Bonnet | |
| 4,138,191 | 2/1979 | Peyman et al. | |
| 4,157,859 | 6/1979 | Terry | |
| 4,406,285 | 9/1985 | Villasenor et al. | |
| 4,546,773 | 10/1985 | Kremer et al. | 128/660 |
| 4,561,852 | 12/1985 | Harte | 434/339 |
| 4,564,078 | 1/1986 | Enokido et al. | 178/18 |
| 4,564,928 | 1/1986 | Glenn et al. | 178/18 |

OTHER PUBLICATIONS

Kremer, "A New Instrument for Clinical Pachometry", Radial Keratotomy (Proceedings of the Semiannual Keratore Fractive Society Meeting on Controversial Aspects of Radial Keratotomy, LAL Publishing, 1980, pp. 201 to 212.

Primary Examiner—Richard J. Apley
Assistant Examiner—H. Macey

[57] ABSTRACT

A system for performing radial keratotomy and the like includes a topographical mapping template attachable to the cornea and a hand-held probe movable within the confines of the template. The template generates a topographical grid of voltage variances on the surface of the cornea, and the probe senses the voltages present at locations within this grid to establish its position. The probe may include a transducer device and a surgical blade which is adjustable to various depths of incision based upon control signals generated by the transducer device. The transducer device itself preferably includes one or more depth measurement units, each of which emits energy from the epithelium layer of the cornea upon the underlying endothelium layer and detects the intensity of the reflected energy. The distance between the point of emission and the point of detection is successively increased until a significant drop in the reflected intensity occurs. The measurement unit then accurately derives the distance between the epithelium layer and the endothelium layer and generates the control signal based upon this calculated distance.

30 Claims, 23 Drawing Figures

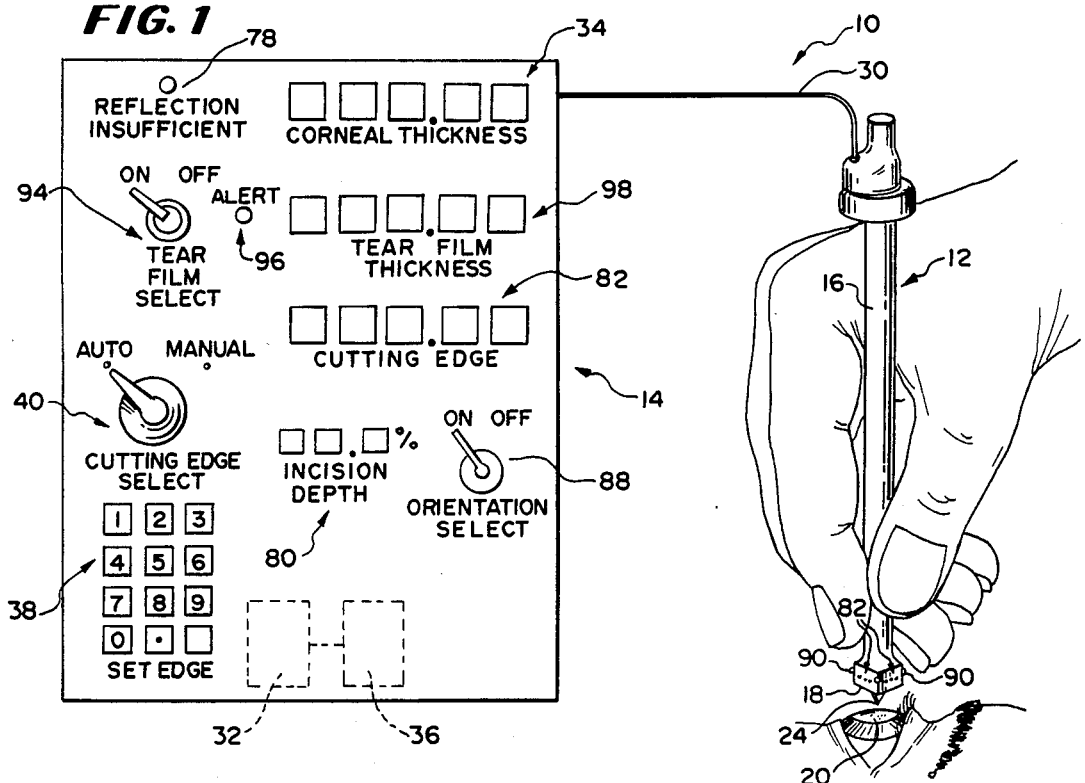
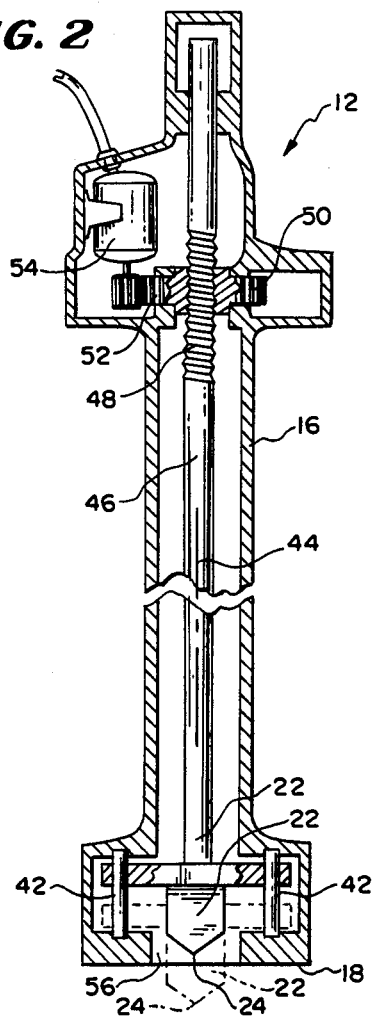
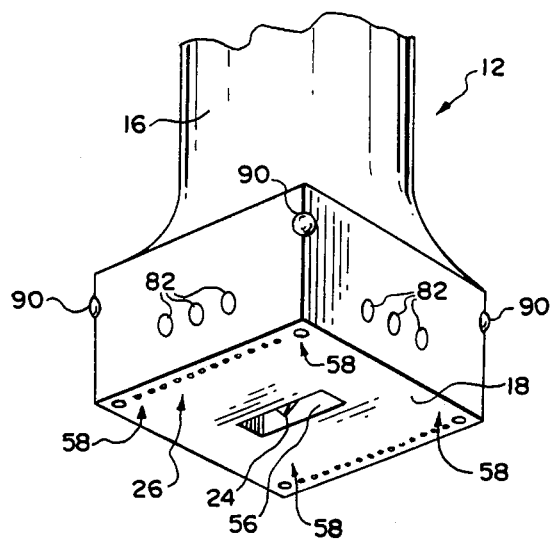

CALCULATE AVERAGE DEPTH

ORIENTATION ASSIST

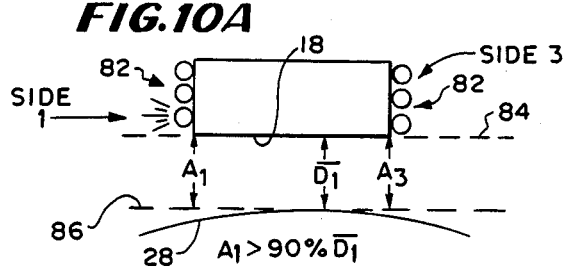
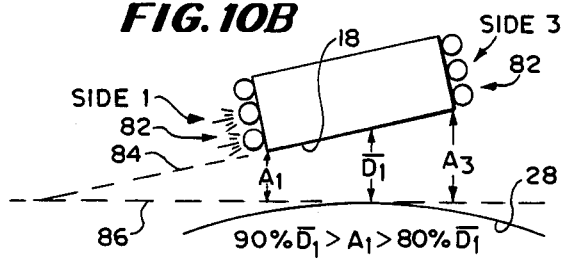
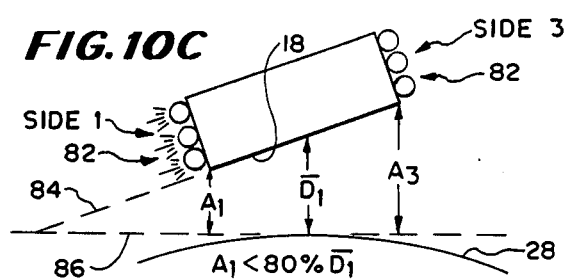
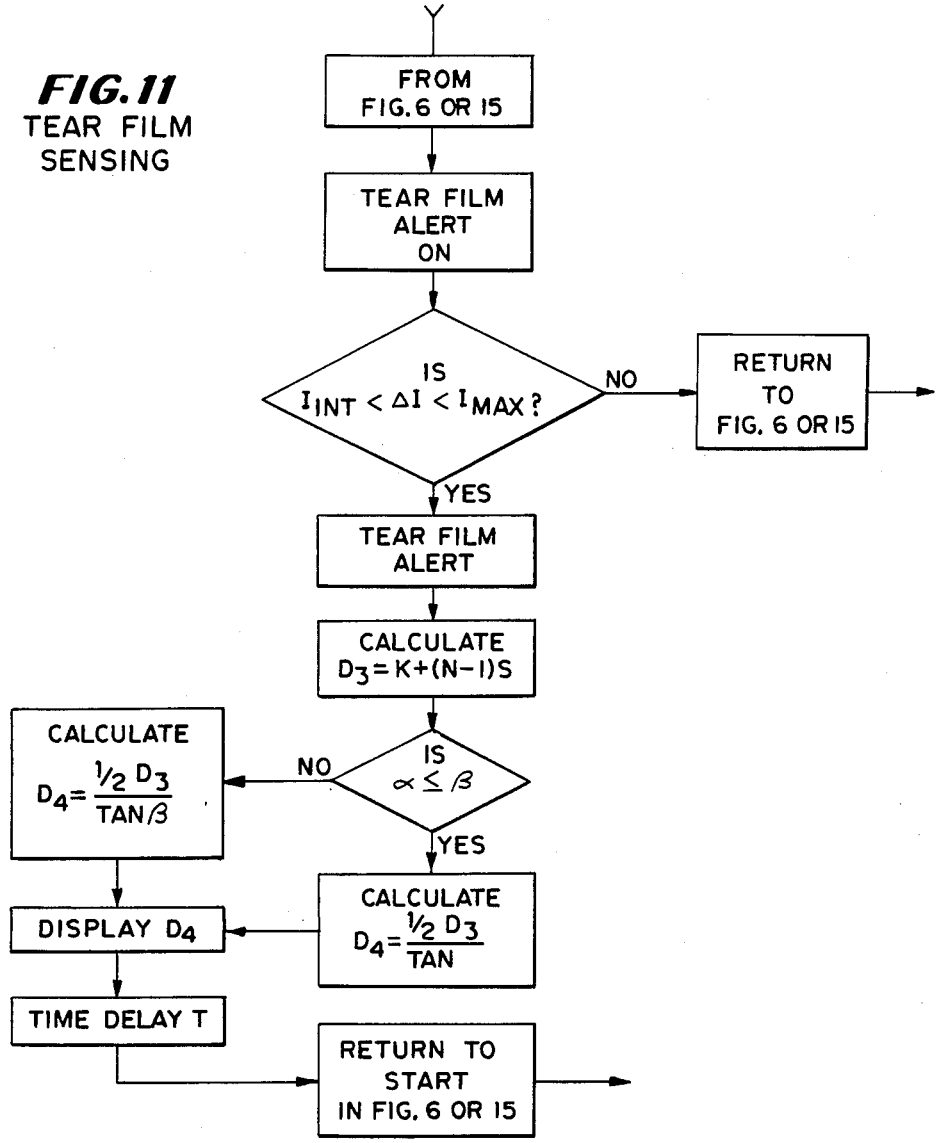

TOPOGRAPHICAL MAPPING, DEPTH MEASUREMENT, AND CUTTING SYSTEMS FOR PERFORMING RADIAL KERATOTOMY AND THE LIKE

FIELD OF THE INVENTION

The invention relates to devices and systems which provide information concerning the topography and depth of a surface region prior to making an incision. Such devices and systems are useful, for example, in the performance of micro-surgical procedures, such as radial keratotomy.

BACKGROUND OF THE INVENTION

There are man.y situations which require the precise measurement of the distance between relatively closely spaced surfaces. Sometimes, these situations involve relatively small surface areas, which further compounds the difficulty of the task.

One good example of such a situation is a surgical procedure known as radial keratotomy.

In radial keratotomy, the surgeon makes a plurality of deep radial incisions in the cornea of the eye. Due to the incisions, the curvature of the cornea can be altered simply by internal eye pressure. Visual defects can be cured in this manner without resort to corrective lenses.

To achieve the benefits of the keratotomy procedure, the incisions must be deep enough to cut through the epithelium layer and penetrate the stromal layer of the cornea. However, the surgeon must exercise great care not to cut too deeply into the stromal area thereby touching or cutting the underlying endothelium layer. Permanent damage to the eye can result.

The surgeon's task is complicated both by the relatively small surface area of the cornea, as well as by the relatively small distances between the epithelium and endothelium layers, which vary from about 700 microns at the edge of the cornea to about 500 microns in the cornea's central optical zone.

At present, the depth, or thickness, of the cornea is determined manually by the surgeon before each incision is made. In one commonly used technique, light from a slit lamp is directed upon the eye. The reflections from the epithelium layer and the endothelium layer are observed. The surgeon then determines the thickness by manually comparing the distance between these two reflections, using either a ruled scale or an optical beam splitting device. Templates and the like can also be used to further assist the surgeon in making the desired incisions. See, for example, Villasenor et al. U.S. Pat. No. 4,406,285.

Another device for measuring the thickness of the cornea has been proposed by Frederic B. Kremer, M.D. in *Radial Keratotomy*, Proceedings of the Semiannual Keratorefractive Society Meeting on Controversial Aspects of Radial Keratotomy, Chapter XXIII, "A New Instrument for Clinical Pachometry," pp. 201 to 212, 1980. Instead of using light energy, Dr. Kremer's device directs ultrasonic energy upon the epithelium and the endothelium layers. The difference between the two reflections is electronically converted to a distance measurement.

One of the principal objects of this invention is to provide a transducer device which, due to its accuracy, can be used in radial keratotomy and other environments where precise depth or thickness measurements are required.

Another principal object of this invention is to provide a transducer device which, in addition to being accurate, is small enough to be incorporated into a hand-held instrument which also carries the surgical blade, making it possible for the surgeon to accomplish, with a single positioning step, multiple tasks during a surgical procedure.

Another principal object of this invention is to provide a topographical mapping system which, due to its compactness and accuracy, can be used in radial keratotomy and other environments when precise locations need to be identified on relatively small surface areas.

Yet another principal object of this invention is to provide a comprehensive corneal topographical mapping, depth measurement, and cutting system which allows a surgeon to accurately perform an essentially automated keratotomy procedure.

SUMMARY OF THE INVENTION

To achieve these and other objects, one aspect of the invention involves a compact transducer device and associated system which can be used to accurately measure the distance between a reference face and an energy reflecting surface closely spaced to the reference face.

Another aspect of the invention involves a topographical mapping device and associated system which can be used to accurately identify the position of a probe on a surface of relatively small area.

In yet another aspect of the invention, the transducer device and topographical mapping device are combined to provide a comprehensive position locating and depth measurement system useful, for example, to perform essentially an automated keratotomy procedure.

More particularly, in the first-mentioned aspect of the invention, the transducer device is incorporated into a hand-held surgical instrument and associated system for performing either manual or automated radial keratotomy. In this embodiment, the instrument includes a housing having an operative face which, in use, is positioned upon the epithelium layer of the cornea undergoing surgery. The transducer device is carried on the operative face and is thus also positioned on the epithelium layer, which becomes the reference face for the device.

In use, the transducer device emits energy toward the endothelium layer, which becomes the reflecting surface for the device. The transducer device detects the intensity of the energy reflected at different locations from the endothelium layer. Based upon the variance in intensity of reflected energy detected at these different locations, the transducer device calculates the distance between the epithelium and endothelium layers. The transducer device generates a signal based upon the calculated distance which, in one embodiment, generates in a user-readable display.

In a preferred embodiment, the instrument also includes a surgical blade which can be positioned for incision either in response to operator control or in response to signals received from the transducer device. Essentially automated keratotomy can thereby be performed.

In a preferred embodiment, the transducer device and system include one or more measurement units situated on the reference face. Each measurement unit comprises energy emitter means positioned in a predetermined association with energy detector means. The emitter means generates a cone of energy toward the reflecting face, the cone having a known angle of emission. The detector means detects, within a known angle of detection, the reflection of this cone of energy by the reflecting surface.

In accordance with this aspect of the invention, the transducer device includes means for sequentially changing the spacing between the emitter means and the detector means from a first interval, in which the emitter means and the detector means are generally spaced together, to successive intervals, each increasing the lateral spacing between the emitter means and the detector means. The intensity of the reflected energy sensed by the detector means is measured at the first interval and each of the successive intervals. When the difference in intensity measured at two adjacent intervals exceeds a predetermined amount, the distance between the reference face and the reflecting surface is calculated, as follows:

$$D1 = \frac{\frac{1}{2} D_2}{\text{Tan } \phi} \quad (1)$$

where D1 is the distance between the reference face and the reflecting surface;

where D2 is the interval between the emitter means and the detector means where the drop in intensity exceeding the predetermined amount occurred; and where $\phi$ is the smaller of the angle of emission of the emitter means and the angle of detection of the detector means.

In one embodiment, the device and system employ one energy detector in association with a series of energy emitters. The emitters are positioned in a straight line which extends from the detector. In operation, the emitters are individually operated in sequence, beginning with the emitter closest to the detector and proceeding toward the emitter farthest away. The detector senses the reflected energy emanating in sequence from the emitters, until the predetermined drop in intensity occurs. D1 is then calculated as above described.

In another embodiment, the device and system employ one energy emitter in association with a series of energy detectors. The detectors are positioned in a straight line which extends from the emitter. In this embodiment, with the emitter energized, the detectors are individually operated in sequence, beginning with the detector closest to the emitter and proceeding toward the detector farthest away, until the predetermined drop in detected intensity occurs. $\overline{D1}$ is then calculated as above described.

In a preferred embodiment, the device and system employ multiple measurement units. The device and system derive a combined average D1 by dividing the sum of all the individual D1's by the number of measurement units. A greater degree of accuracy is thereby achieved.

The device and system are also capable of generating signals to assist the operator in properly positioning the device on the reference face.

For example, in one embodiment, the device and system derive a partial average of the D1's obtained by a selected number of measurement units. The partial average is compared to the combined average $\overline{D1}$ of all the measurement units present. The comparison generates signals which prompt the user to position the transducer device on the reference face in a generally parallel relationship with the reflecting surface.

As another example, in another embodiment, the device and system sense when an unexpected intermediate drop in intensity occurs before the expected predetermined drop. When this occurs, signals are generated which indicate that the proper degree of contact between the device and the reference face is not being made.

In the second-mentioned aspect of the invention, the topographical mapping device and system include a template which is attachable to an electrical energy conducting surface, such as the cornea of the eye. The template alternately establishes two non-parallel voltage gradients across the conducting surface bounded by the template. The device and system further include a probe which can be selectively positioned upon the surface bounded by the template. The probe includes means for sensing the voltage present at the surface beneath the probe. Based upon the voltage readings, an operator readable display is created, by which the position of the probe within the area bounded by the template can be established.

In the third-mentioned aspect of the invention, the above-described probe includes a transducer device. When used in association with the position-indicating template, the probe provides both a topographical and a depth display. By further equipping the probe with an automatically controlled surgical blade, an essentially automated keratotomy procedure can be performed.

Other features and advantages of the invention will be pointed out in, or will be apparent from, the specification and claims. Obvious modifications of the embodiments shown in the drawings as will also be apparent.

BRIEF DESCRIPTION OF THE DRAWINGS

FIG. 1 is a system for performing either manual or automated radial keratotomy. The system includes a surgical instrument which incorporates a transducer device embodying the features of the invention;

FIG. 2 is an enlarged side sectional view of the top and bottom portions of the surgical instrument shown in FIG. 1, showing the movable blade positioned within the instrument;

FIG. 3 is an enlarged perspective view of the operative face of the surgical instrument shown in FIG. 1, showing the location of the transducer device upon the operative face;

FIGS. 10A, 10B, and 10C are largely diagrammatic views of the operation of the transducer device in prompting the user to position the device using the logic sequence shown in FIG. 9;

FIG. 11 is a logic chart showing a sequence of the operation of the transducer device and system in determining the presence of a tear film;

Figure 4:
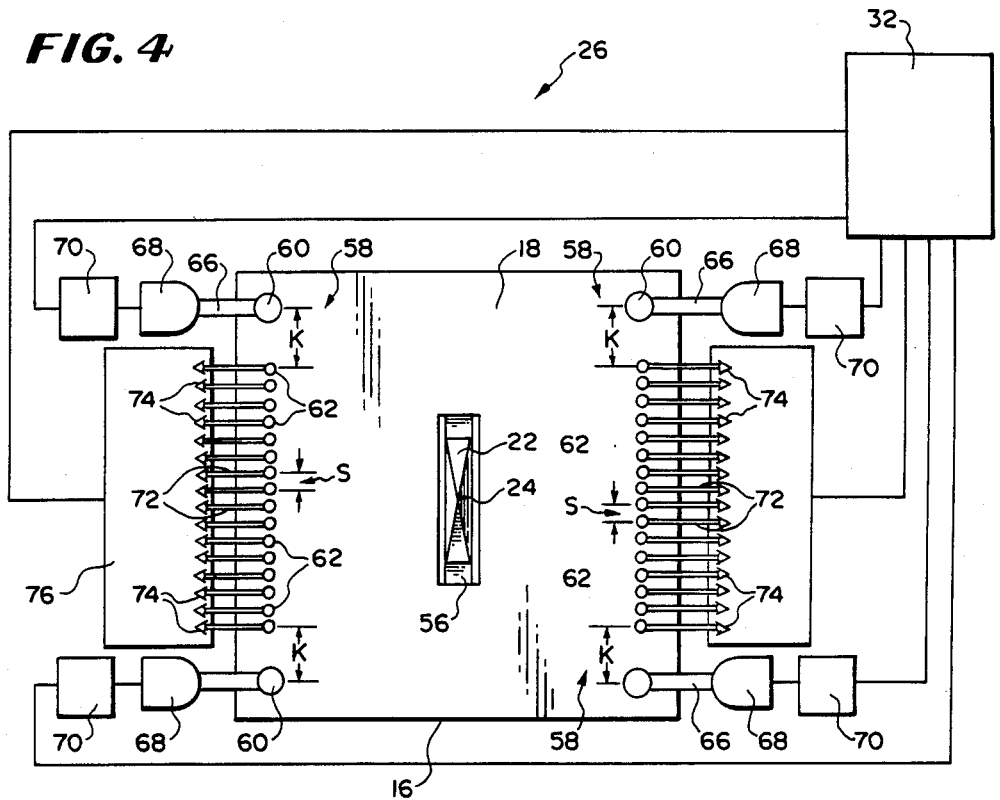
FIG. 4 is an enlarged, largely diagrammatic view of an embodiment of the transducer device and associated system which embody the features of the invention.

Before explaining the embodiments of the invention in detail, it is to be understood that the invention is not limited in use to the details of construction and the arrangement of components set forth in the following description or as illustrated in the drawings. The invention is capable of other embodiments and of being practiced and carried out in various ways. It should also be understood that the phraseology and terminology employed is for the purpose of description and should not be regarded as limiting.

DESCRIPTION OF THE PREFERRED EMBODIMENTS

As alluded to above, there are several important aspects of this invention. One aspect involves deriving a depth measurement. Another aspect involves deriving a topographical measurement. Yet another aspect involves a marriage of the two.

Attention is first directed to FIGS. 1 to 3 and to the depth measurement aspect of the invention. There, a system 10 for performing either manual or automated keratotomy is shown. As shown in these Figures, the system includes a surgical instrument 12 and a control module 14 electrically coupled to the surgical instrument 12.

As can be seen in FIG. 1, the instrument 12 includes a housing 16 which is sized and shaped to be conveniently held and manipulated in one hand of the surgeon. The housing 16 includes at one end a generally flat operative face 18 (best seen in FIG. 3) which, in use, is positioned by the surgeon on the epithelium layer 20 of the cornea undergoing surgery (in this respect, also see FIG. 5).

As can be seen in FIG. 2, a surgical blade 22 is mounted for movement within the housing 16. The blade 22 has a cutting edge 24 which, by controlled movement of the blade 22 within the housing 16, can be accurately positioned a desired distance beyond the operative face 18 of the instrument 12 (as shown in phantom lines in FIG. 2) to make the incisions desired during the surgical procedure.

In accordance with this aspect of the invention, the hand-held surgical instrument 12 includes a transducer device 26 (see FIG. 3) arranged on its operative face 18 in the vicinity of the cutting edge 24. In use, the transducer device 26 measures the thickness of the cornea. As used herein, the "thickness" of the cornea is the distance between the surface of the epithelium layer 20 and the surface of the endothelium layer 28 of the cornea (shown diagrammatically in FIG. 5). The distance (which is designated D1) is used by the surgeon in properly positioning the cutting edge 24 of the blade 22 to make the desired incisions during surgery.

As shown in FIG. 1, the control module 14 is coupled to the instrument 12 by a control cord 30. The module 14 includes first circuit means 32 for receiving and interpreting the signals generated by the transducer device 26. The module 14 also includes a first display 34 (entitled "Corneal Thickness" in FIG. 1) for showing the signals, as interpreted by the first circuit means 32, in a user-readable, numeric format.

The control module 14 also preferably includes second circuit means 36 to use the signals generated by the first circuit means 32 to automatically position the surgical blade 22 to achieve the desired depth of incision. Alternately, the module can include user-activated input controls 38 (entitled "Set Edge" in FIG. 1) to manually adjust the position of the surgical blade 22. A control switch 40 (entitled "Cutting Edge Select" in FIG. 1) is movable between an "Auto" mode, activating the second circuit 36 means, and a "Manual" mode, activating the user activated input controls 38.

More particular attention is now directed to the movable surgical blade 22 carried within the housing 16, as is best shown in FIG. 2. While the blade 22 can be mounted for movement in various ways, in the illustrated embodiment, the blade 22 is carried by guide pins 42 for movement along the axis 44, or centerline, of the instrument 12. The blade 22 is operatively connected to a shaft 46 which is itself mounted for axial movement within the housing along this centerline axis 44.

The shaft 46 includes a threaded section 48. The threaded section 48 is operatively connected to an internally threaded gear 50 which is mounted for rotation within the housing. Rotation of the threaded gear 50 moves the shaft, and thus the blade, axially along the centerline axis 44, as shown in phantom lines in FIG. 2.

The threaded gear 50 is operatively coupled to a drive gear 52 powered by an electric motor 54 mounted in the housing. The motor is activated by control signals received from the second circuit means 36. These control signals are derived, depending upon the position of the control switch 40, either automatically, based upon the distance measurement derived by the transducer device 26, or manually, based upon the input of the surgeon using the controls 38.

An opening 56, centered about the centerline axis 44, is formed in the operative face 18 of the instrument 12. The cutting edge 24 moves through the opening 56 beyond the plane of the operative face 18 in response to operation of the motor 54.

Attention is now directed to the transducer device 26 associated with the instrument 12. In use, the transducer device 26 rests upon the epithelium layer and emits a defined cone of energy toward the endothelium layer. The device 26 senses the extent to which this cone of energy is reflected by the endothelium layer toward the epithelium layer. In so doing, the device 26 measures the corneal thickness.

Figure 5:
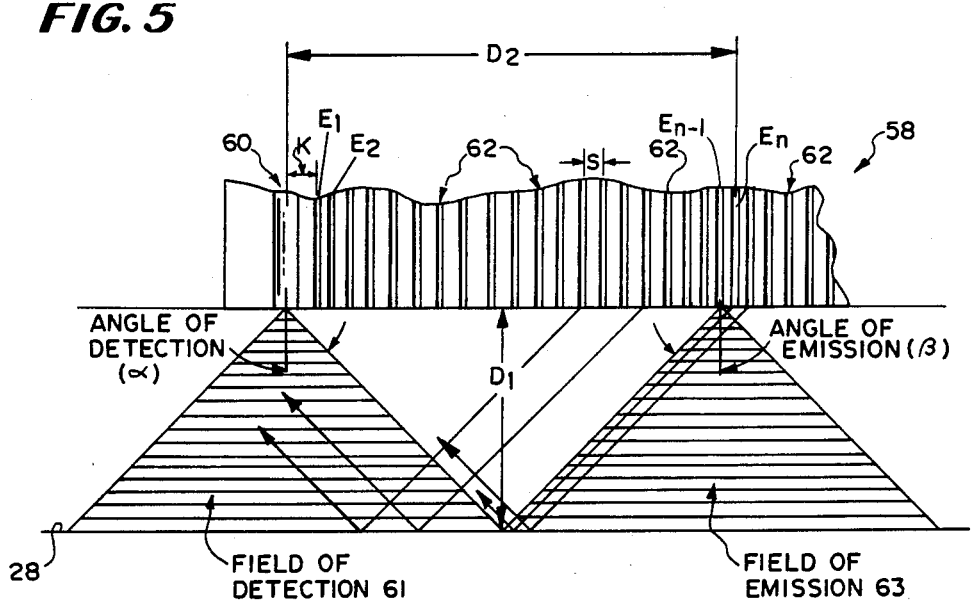
FIG. 5 is a diagrammatic view of the distance measurement operation of the transducer device shown in FIG. 4.

Attention is now directed principally to FIGS. 3 to 5, where one embodiment of the transducer device 26 which embodies the features of the invention is shown.

In this embodiment, the transducer device 26 includes at least one measurement unit 58, which consists of one energy detector 60 positioned in a predetermined association with a plurality of energy emitters 62. When energized, each emitter 62 transmits a band of energy which is reflected by the endothelium layer. The associated detector 60 responds to this band of energy and, upon receiving the energy, generates a signal usable by the first circuit means 32.

The particular number of measurement units 58 employed can vary according to the degree of precision required. Generally speaking, when more measurement units 58 are used and properly arranged upon the operative face 18, a greater degree of accuracy can be expected.

In the embodiment shown in FIG. 4, four measurement units 58 are used, each having one detector 60 and a plurality of associated emitters 62. Employed in this number, the four detectors 60 are equally spaced upon the operative face 18, each being located at a corner of the operative face diametrically spaced at equal distances from the centerline axis 44 of the housing 16.

In this arrangement, the plurality of emitters 62 for each detector 60 extend along a straight line from the detector, being arranged generally parallel to the adjacent side edge of the operative face 16. The emitters 62 are equally spaced a predetermined distance K from their companion detector 60. The emitters 62 are also themselves separated by a constant, predetermined distance S.

Within each measurement unit 58, the number of emitters 62 associated with each detector 60, as well as the spacing K and S between the detector 60 and emitters 62, can vary according to the degree of precision desired. With greater numbers of emitters 62, coupled with closer spacing intervals, a greater degree of accuracy can be expected.

In FIG. 5, one measurement unit 58 is shown in its operative position upon the epithelium layer 20 of the eye. As shown in FIG. 5, each emitter 62 transmits energy in a cone-shaped field 63. The particular angle at which the emitter 62 transmits the cone of energy 63 can vary, as long as it is known to the operator. This angle (identified as $\beta$ in FIG. 5) will hereafter be referred to as the "angle of emission" of the emitter.

As is also shown in FIG. 5, each detector 60 responds to the energy transmitted by one of the associated emitters 62 within a cone-shaped field 61, which can also be considered to be the field of view of the detector 60. The particular cone angle at which the detector 60 receives this energy can vary, as long as its value is known to the operator. This angle (identified as $\alpha$ in FIG. 5) will hereafter be referred to as the "angle of detection" of the detector 60.

The band of energy which is emitted and detected by the device 12 can vary, with the controlling criteria being that it lies within a band which is reflected by the reflecting surface (i.e., the endothelium layer 28). In the illustrated and preferred embodiment, the band of energy employed is visible light.

In the illustrated embodiment (see FIGS. 4 and 5), conventional optical fibers are used to transmit the light energy.

More particularly, as shown in FIG. 4, for each measurement unit 58, the detector 60 comprises an optical fiber 66 which has one end affixed flush upon the operative face 18 of the instrument 12 and an opposite end operatively coupled to a phototransistor 68. The phototransistor 68, in turn, is connected to an analog-to-digital converter 70, which converts the analog current generated by the phototransistor 68 to a digital signal. This digital signal is transmitted to the remainder of the first circuit means 32.

In the illustrated embodiment, the angle of detection "$\alpha$" selected of each detector 60 is approximately 35 degrees.

As is also shown in FIG. 4, for each measurement unit 58, each emitter 62 comprises an optical fiber 72 having one end affixed flush upon the operative face 18 and an opposite end operatively coupled with a light emitting diode 74. A diode driver circuit 76 couples each light emitting diode 74 with the remainder of the first circuit means 32.

In a preferred embodiment, approximately sixty-eight (68) emitting optical fibers 72 extend between the detectors 60 on opposite edges of the operative face 18. Each fiber 72 is approximately 0.13 micron in diameter. The angle of divergence $\beta$ of each emitter is approximately 24 degrees.

The first circuit means 32 preferably includes a programmable read only memory (PROM) or the like to retain the constant operating characteristics of the associated transducer device 26, such as the spacing K and S between the detector and emitters within each measurement unit; the angle of detection $\alpha$ of the detectors; and the angle of emission $\beta$ of the emitters 62.

Figure 6:
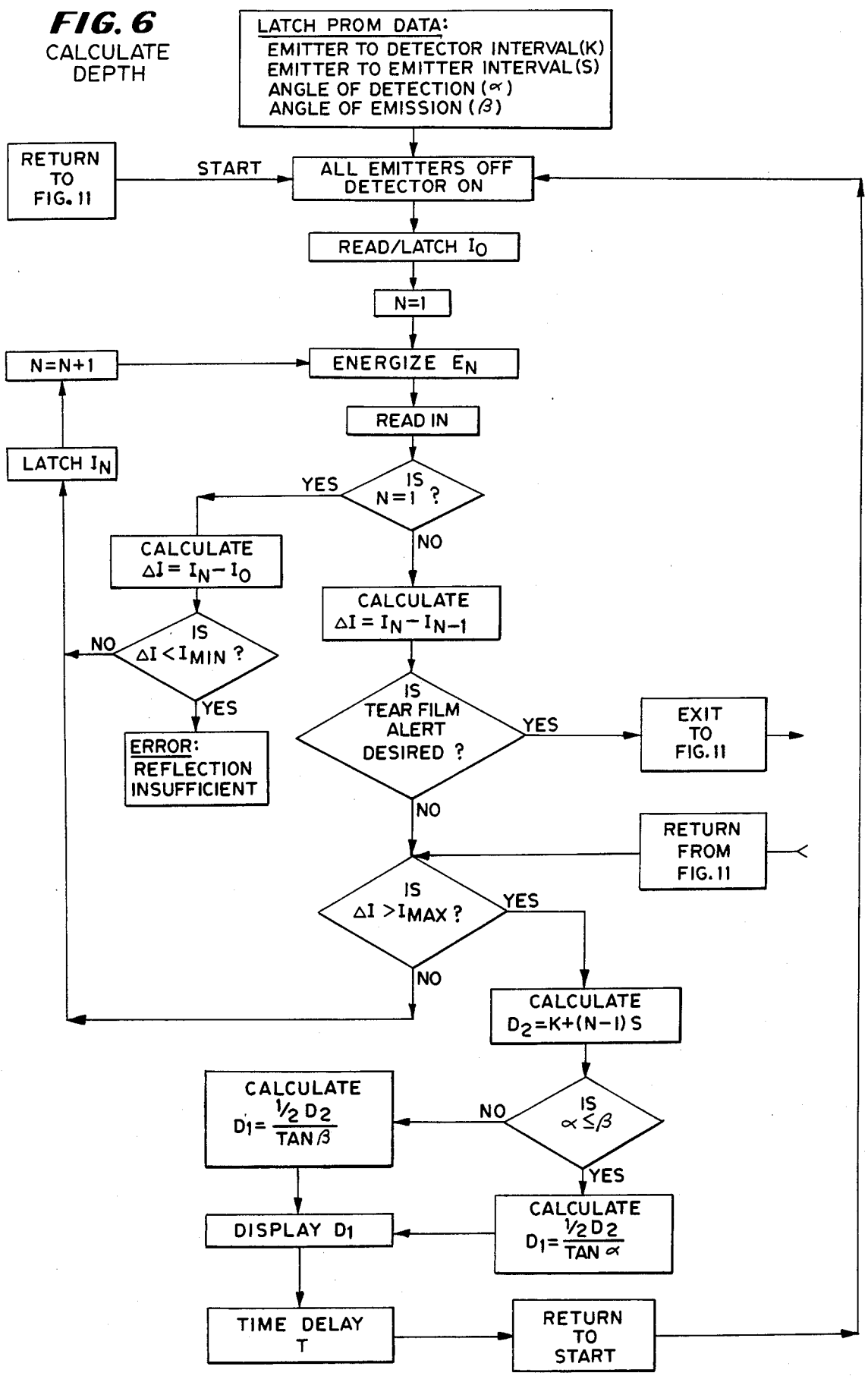
FIG. 6 is a logic chart showing a sequence of the operation of the transducer device and system shown in FIGS. 4 and 5.

The operation that the transducer device 26 follows in measuring corneal thickness is shown diagrammatically in FIG. 5. The corresponding control logic of the first circuit means 32 is shown in FIG. 6.

At the beginning of the sequence of operation of each measurement unit 58, no emitter 62 is energized. The first circuit means 32 reads the digital number present at the detector 60, which indicates a base intensity of ambient light being reflected by the endothelium layer 20. This digital number (designated $I_O$ in FIG. 6) is latched by the first circuit means for future use.

The emitter 62 closest to the detector 60 (which is designated E1 in FIG. 5) is now energized by the first circuit means 32 by sending a signal, via the diode driver circuit 76, to the associated diode 74. No other emitter 62 is energized at this time.

The emitted cone of energy proceeds through the epithelium layer 20 toward the endothelium layer 28. The cone is eventually reflected by the endothelium layer 38 back toward the detector 60.

With the emitter E1 energized, the first circuit means 32 reads the digital number present at the detector ($I_N$ in FIG. 6, with $N=1$). This digital number I is compared to the first obtained digital number $I_O$. The difference ($\Delta I_N$ in FIG. 6) represents the intensity of light attributable to the reflection from the energized emitter E1.

The first circuit means 32 compares this difference $\Delta I$ to a predetermined minimal amount ($I_{MIN}$ in FIG. 6).

If this difference $\Delta I$ is not larger than the predetermined minimal amount $I_{MIN}$, the first circuit means 32 generates an error signal. This error signal is visually displayed on the control module by energizing an error light 78, labeled "Reflection Insufficient" in FIG. 1. The error light 78 indicates to the surgeon that, for various reasons, the endothelium layer 28 is not reflecting light sufficient enough to be read by the device 26. These reasons can include an unusually thin cornea or a defective diode driver circuit. If the first measured intensity difference is larger than the minimal amount $I_{MIN}$, the digital number associated with the first emitter D1 is latched. The first circuit means 32 continues with its sequence of operation.

The first circuit means 32 now turns off the first emitter E1 and turns on the next adjacent emitter (E2 in FIG. 5). Again, the digital number at the detector 60 is read, which is designated in FIG. 6 as $I_N$ with N=2. It is compared to the most previously obtained digital number (associated, in this instance, with emitter E1 and designated $I_{N-1}$ in FIG. 6). If the cone of reflected energy is still within the detector's field of view 61, as it is in FIG. 5, the new digital number $I_N$ should be essentially the same as the previously obtained number $I_{N-1}$. To establish this, the first circuit means compares these two digital numbers deriving a new $\Delta I$. If the difference $\Delta I$ between $I_N$ and $I_{N-1}$ is less than a predetermined amount $I_{MAX}$, last obtained digital number from an emitter (E2, in this instance) is latched. The first circuit means 32 continues with its sequence of operation.

In accordance with the invention, the first circuit means 32 continues to individually energize the emitters 62, sequentially beginning with the one closest to the detector (E1 in FIG. 5) and proceeding toward the emitter farthest away. This sequence continues until the difference $\Delta I$ between the digital numbers associated with two adjacent emitters is larger than the predetermined amount $I_{MAX}$.

As shown in FIG. 5, this large drop in reflected intensity between two adjacent emitters and ($E_{N-1}$ and $E_N$ in FIG. 5) occurs when the cone of reflected light energy first falls outside the field of view 61 of the detector 60.

When this large drop in reflected intensity occurs, the first circuit means 32 turns off the last-energized emitter (En). The first circuit means 32 then calculates the distance (D2 in FIG. 5) between this emitter En and the detector 60, relying upon PROM data relating to emitter and detecting spacing, as follows:

$$D_2 = K + (N-1)S \quad (2)$$

where N is the number of the emitter;
where $D_2$ is the total distance between the detector 60 and the emitter $E_N$;
where K is the interval between the detector 60 and the closest emitter $E_1$; and
where S is the interval between each emitter 62.

Having determined D2, the first circuit means now calculates the distance between the epithelium and the endothelium layers (D1 in FIG. 5) as follows:

$$D1 = \frac{\frac{1}{2} D2}{\tan \phi} \quad (3)$$

where $\phi$ is either the angle of emission $\alpha$ or the angle of detection $\beta$, whichever is smaller.

When there are multiple measurement units 58, the first circuit means 32 sequentially follows the above-described sequence for each measurement unit 58, obtaining for each unit 58 its corresponding D1 value. The first circuit means 32 then calculates average corneal thickness measurement $\overline{D1}$.

Figure 7:
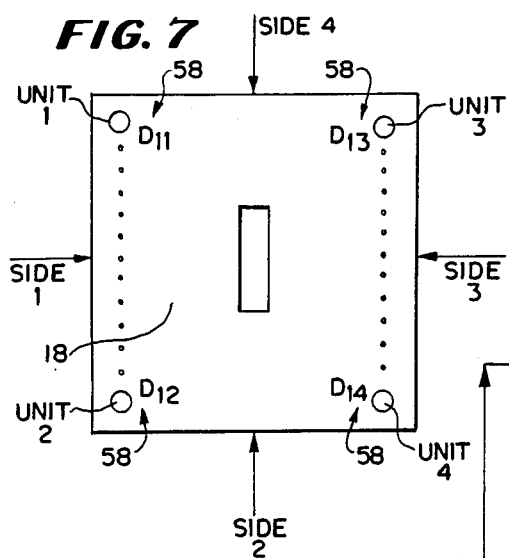
FIG. 7 is another diagrammatic view of the operative face of the instrument with portions identified to correspond with the symbols used in FIGS. 8 and 9.
Figure 8:
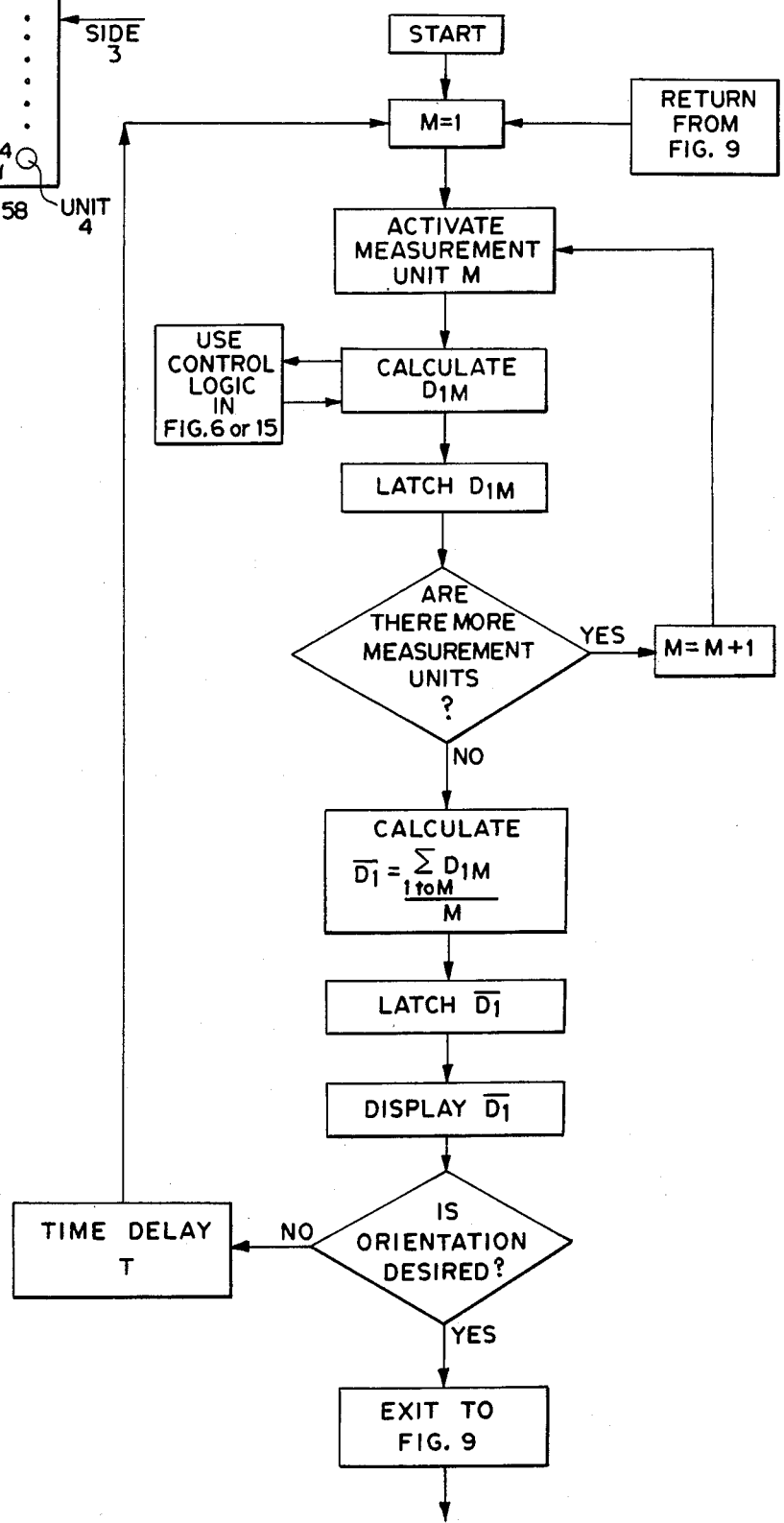
FIG. 8 is a logic chart showing a sequence of the operation of the transducer device and system in deriving a combined average D1 for multiple measurement units.

The control logic for this sequence is shown in FIGS. 7 and 8.

In FIG. 7, the measurement units 58 located at each operative face 18 are designated as UNITS 1 to 4. The side edges of the face are also designated SIDES 1 to 4.

There will be a corneal depth measurement D1 associated with each measurement unit 1 to 4, which is derived for each measurement unit as shown in FIG. 6. In FIG. 7, a descriptive format is adopted in which the D1 associated with the measurement unit 1 is designat $D_{11}$. Likewise, the D1's associated with the measurement units 2, 3, and 4 are designated $D_{12}$, $D_{13}$ and $D_{14}$, respectively.

As shown in FIG. 8, distances $D_{11}$, $D_{12}$, $D_{13}$, and $D_{14}$ are calculated individually by the first circuit means 32, relying upon the control logic shown in FIG. 6. Each distance $D_{11}$, $D_{12}$, $D_{13}$, and $D_{14}$ are latched. Then, a combined average $\overline{D1}$ of $D_{11}$, $D_{12}$, and $D_{13}$, and $D_{14}$ is calculated, latched, and displayed, as follows:

$$\overline{D1} = \frac{\sum_{1 \text{ to } M} D_{1M}}{M}$$

where M is the number of measurement units;
where $D_{1M}$ is the measurement D1 associated with each measurement unit 1 to M; and
where $\overline{D1}$ is the combined average.

Once D1 (if only one measurement unit is used, as shown in FIG. 6) or $\overline{D1}$ (if multiple measurement units are used, as shown in FIG. 8) is determined, the first circuit means 32 displays the result in the display 34.

As shown in FIGS. 6 and 8, a new $\overline{D1}$ or D1 is derived after a time delay T to update the display 34.

Knowing D1 or $\overline{D1}$, the surgeon can manually adjust the cutting edge of the instrument 12 to the desired depth of incision by setting the control switch 40 to "Manual" and using the input controls 38 on the control module 14. Usually, the depth of incision selected is about 75% to 90% of the measured corneal thickness.

Alternately, the first circuit means 32 can be linked with the second circuit means 36 to automatically set the depth of incision. In this arrangement, with the control switch 40 set on "AUTO," the surgeon can use the input controls 38 to enter the desired incision depth, expressed as a percentage of the corneal thickness derived by the first circuit means 32. This desired percentage can, if desired, be shown on the control module 14 by a display 80 (entitled "Incision Depth" in FIG. 1). Having the desired relationship between depth of incision and corneal thickness programmed, the second circuit means 36, the control means can apply this relationship based upon the output of the first circuit means 32 to automatically adjust the cutting edge 24 of the blade 22 to obtain the desired depth of incision.

Another display 82 (entitled "Cutting Edge" in FIG. 1) can be used to show the actual depth of incision as manually or automatically derived.

The use of multiple measurement units 58 is preferred, because use of an average measurement $\overline{D1}$ promotes greater accuracy.

Furthermore, in accordance with another aspect of the invention, the average measurement $\overline{D1}$ can also be used to prompt the user to properly positioning the plane of the operative face 18 of the instrument 12 relative to the plane of the reflecting surface. In the context of radial keratotomy, by properly positioning the operative face 18 upon the epithelium layer, an incision can be made which is generally normal to the endothelial plane.

More particularly, as shown in FIGS. 1 and 3, the instrument includes an array 82 of three position-indicating lights arranged along each side edge of the operative face 18. Each side edge adjoins the operative face 18 at a right angle. This same arrangement is shown diagrammatically in FIGS. 10A, B, and C for SIDES 1 and 3 (as designated in FIG. 7).

In accordance with the invention, when a given side edge is close to being generally perpendicular to the underlying endothelium layer 28, indicating a general parallel relationship between the plane 84 of the operative face 18 and the endothelial plane 86, one of the lights 82 is energized (see FIG. 10A). When a given side edge is not generally perpendicular to the underlying endothelium layer 28, indicating an undesirable non-parallel relationship between the operative face 18 and the endothelium, two or more of the lights 82 are energized, depending upon how large the variance from perpendicular is. Three lights 82 are energized if the variance is relatively large (see FIG. 10C), while only two lights 82 are energized if the variance is relatively small (see FIG. 10B).

Should the user desire assistance in orienting the instrument 12, a switch 88 on the control module 14 (entitled "Orientation Select" in FIG. 1) is moved to its "ON" position. This, as seen in FIG. 8, activates the positioning aspect of the first circuit means 32, the control logic of which is shown in FIG. 9.

Figure 9:
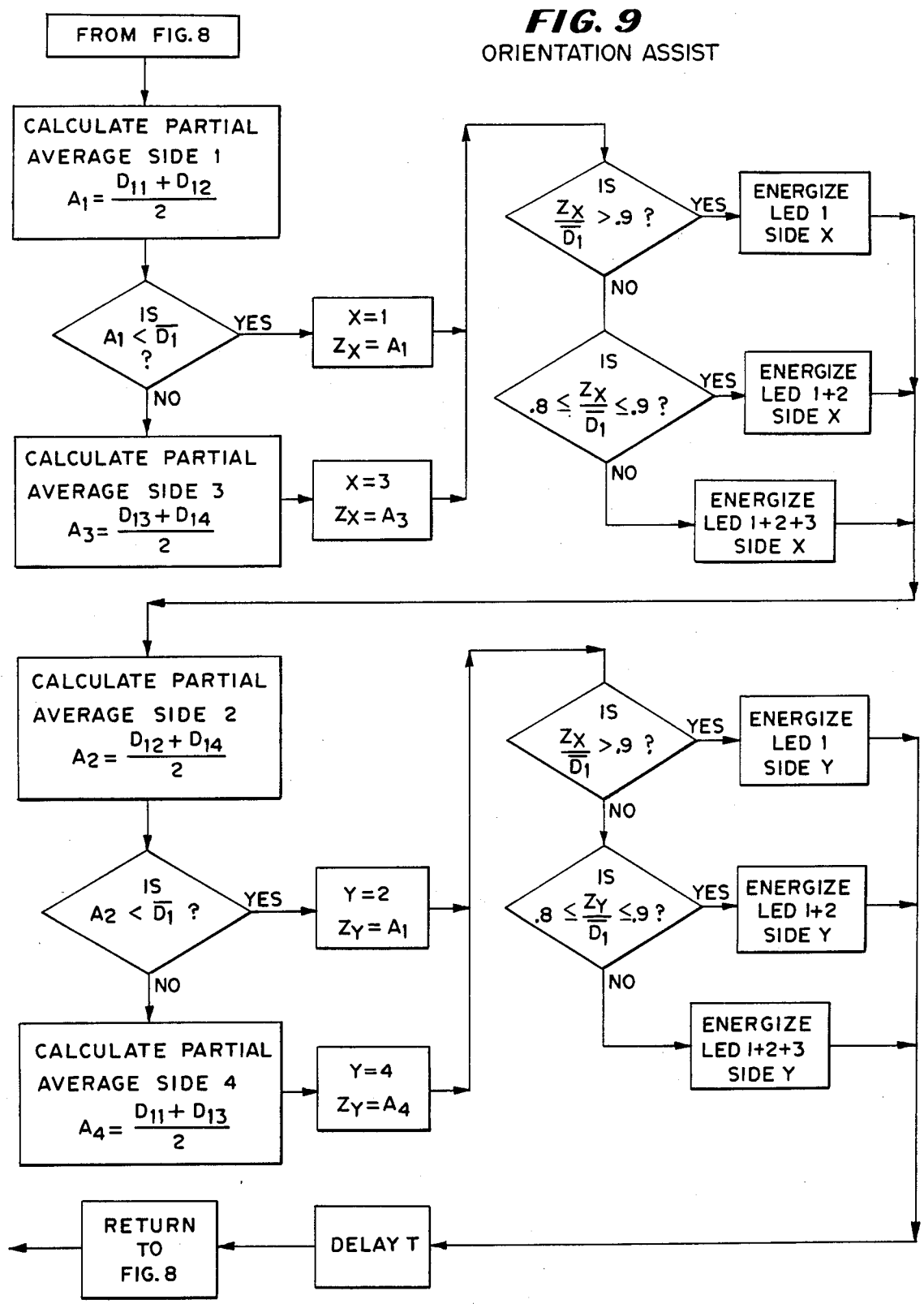
FIG. 9 is a logic chart showing a sequence of the operation of the transducer device and system in deriving signals to prompt the user to properly position the device on the reference face.

As shown in FIG. 9, after the first circuit means 32 has derived the combined average $\overline{D1}$ in accordance with the logic shown in FIG. 8), the first circuit means 32 derives a partial average A1, A2, A3, and A4, respectively, for each side edge 1, 2, 3, 4 of the operative face 18 by calculating an average of the D1's obtained from measurement units positioned along the respective side edge.

Thus, the partial average A1 is the average of $D_{11}$ and $D_{12}$; the partial average A2 is the average of $D_{12}$ and $D_{14}$; the partial average A3 is the average of $D_{13}$ and Dhd 14; and partial average A4 is the average of $D_{11}$ and $D_{13}$.

As further shown in FIG. 9, the first circuit means 32 next compares the combined average $\overline{D1}$ with the partial averages for opposite pairs of side edges of the operative face (A1/A3 and A2/A4).

When a partial average along a given side edge is less than the combined average D1, the circuit means 32 derives the ratio between that partial average and D1, by dividing the partial average by D1.

When the plane of the associate side edge is close to being generally perpendicular to the plane of the endothelium layer, the ratio derived will approach 1.0. In FIG. 9, ratio values exceeding 0.9 are selected as the point of comparison, indicating that the partial average is over 90% of D1. In this instance, only one light 82 is energized, as shown with respect to SIDE 1 in FIG. 10A, to notify the operator of this desirable relationship.

When the plane of the side edge and the endothelial plane are out of perpendicular by a relatively small variance, the ratio derived will be smaller. In FIG. 9, a range of ratio values between 0.8 and 0.9 (i.e., between 80% and 90%) is selected for the comparison. Two lights 82 are energized, as shown with respect to SIDE 1 in FIG. 10B, to notify the operator of this relationship.

When the plane of the side edge and the endothelial plane are out of perpendicular by a relatively large variance, the ratio derived will be still smaller. In FIG. 9, a range of ratio values below 0.8 is selected. Three lights 82 are energized as shown in FIG. 10C with respect to SIDE 1, to alert the operator of this relationship.

This logic sequence is followed and the results latched for a discrete time interval (Delay T in FIG. 9), after which time the sequence is repeated to update the results.

In accordance with the invention, when the surgeon obtains either the absence of all lights 82 or the presence of a single light 82 on the side edges of the operative face 18, the surgeon is assured that the operative face 18 of the instrument 12 is generally parallel, both laterally and longitudinally, to the plane 28 of the endothelium. The surgeon is thus assured that the incision will be made normal to the endothelium plane 28.

In accordance with another aspect of the invention, the transducer device 26 is also operative to detect when all or a part of the operative face 18 is not in contact with the epithelium layer 20, such as when a tear film is present.

As best shown in FIG. 3 the instrument 12 includes a single light 90 on each side edge corner on the operative face 18. In accordance with the invention, this light 90 is energized when there is not proper contact between the reference face (i.e., the epithelium layer 20) and the measurement unit 58 located in that corner of the instrument 12.

Figure 12:
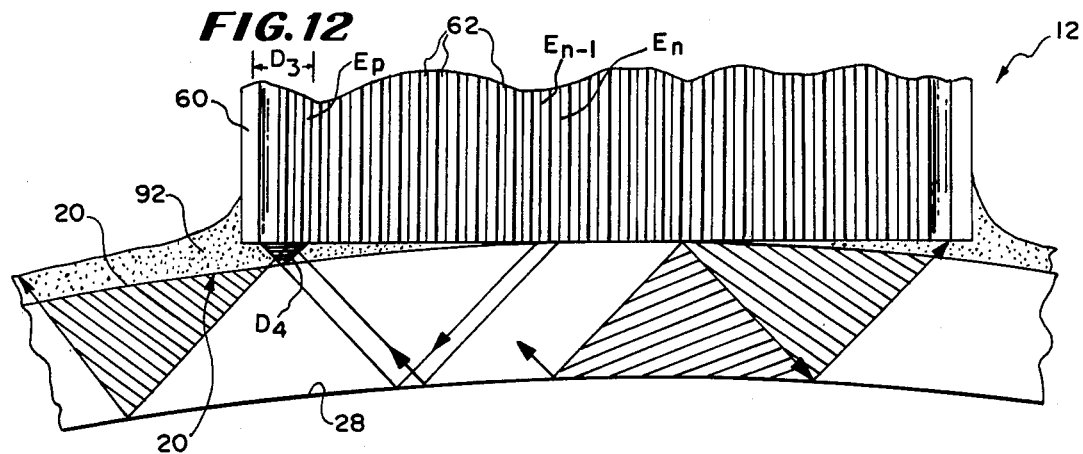
FIG. 12 is a diagrammatic view of the tear film determination operation of the transducer device, employing the logic sequence shown in FIG. 11.

The presence of a tear film 92 and its detection by the transducer device 26 is shown diagrammatically in FIG. 12. Due to the presence of the tear film 92, energy emitted by the emitters 62 in the tear film 92 will be reflected both by the surface of the epithelium layer 20 (due to lack of contact) and the the endothelium layer 28. This combined reflection will be sensed by the detector 60, as long as it falls within its field of view.

When the tear film 92 is present, as the emitters 62 are sequenced by the first circuit means 32 in accordance with the invention, the detector 60 will sense not one, but two drops in the reflected intensity. The first drop in intensity will occur when the reflection of light off the surface of the epithelium layer 20, due to the presence of the tear film 92, fall outside the field of view of the detector 60, which will occur when emitter $E_p$ in FIG. 12 is energized. However, at this point, the reflection of light from the emitter $E_p$ off the endothelium layer 28 is still fully within the field of view of the detector 60. Thus, the first detected drop in intensity will not be as large as the predetermined amount $I_{MAX}$. This second, larger drop in intensity will occur when the reflection off the endothelium layer 28 falls outside the field of view of the detector, which will occur later in the operative sequence when emitter $E_N$ FIG. 12 is finally energized.

Should the user desire to be alerted to the presence of a tear film, or any other circumstance when contact between a measurement unit 58 and the epithelium layer 20 is prevented, a switch 94 on the control module 14 (entitled "Tear Film Select" in FIG. 1) is moved to its "ON" position. This, as shown in FIG. 6, activates the tear film sensing aspect of the first circuit means 32, the logic chart for which is shown in FIG. 11.

As shown in FIG. 11, for each measurement unit 58, when the first circuit means 32 senses a drop in intensity $\Delta I$ which is less than the anticipated maximum drop $I_{MAX}$, but which is still larger than a predetermined intermediate value $I_{INT}$, the tear film alert light 90 occupying the corner adjacent to the measurement unit 58 is activated to notify the surgeon. An additional tear film alert light 96 on the control module 14 (see FIG. 1) can also be activated, along with an audible alarm. The surgeon is then prompted to reposition the operative face 18 of the instrument 12 until the tear film lights 90 and 96 are extinguished.

Furthermore, as shown in FIG. 11, the location of the emitter $E_p$, at which the intermediate drop $I_{INT}$ occurred, can be used by the first circuit means 32 to calculate the actual thickness of the tear film. More particularly, knowing the distance D3 between the detector and emitter Ep, the distance D4 between the operative face 18 of the instrument 12 and the epithelium layer 20 can be calculated as follows:

$$D4 = \frac{\frac{1}{2} D3}{\operatorname{Tan} \phi} \quad (5)$$

As shown in FIG. 1, this information can also be shown in a display 98 (entitled "Tear Film Thickness") on the control module 14 to give further information to the surgeon and to lend assistance in positioning the operative face 18 of the instrument 12.

Figure 13:
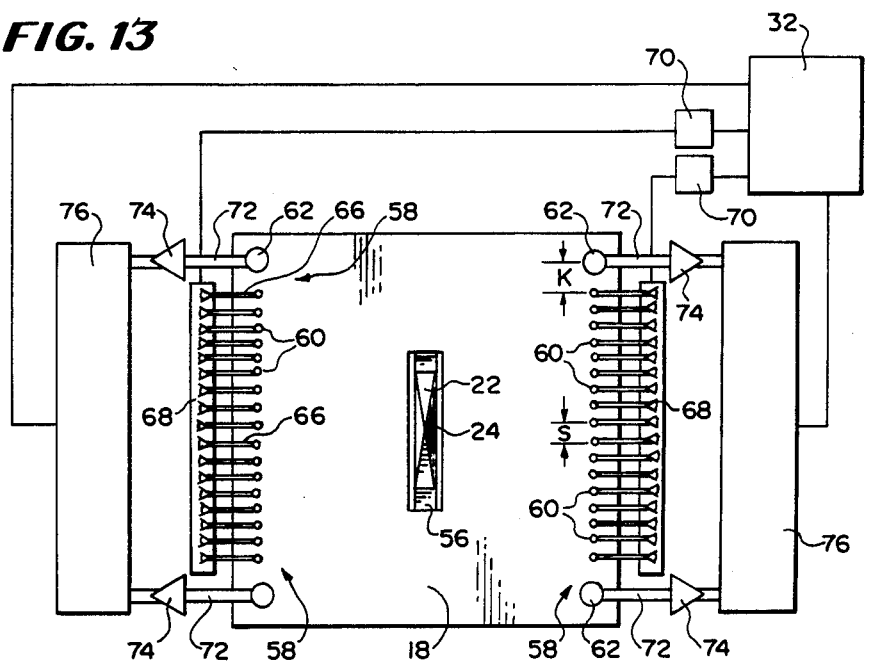
FIG. 13 is an enlarged, largely diagrammatic view of another embodiment of the transducer device and associated system which embody the features of the invention.
Figure 14:
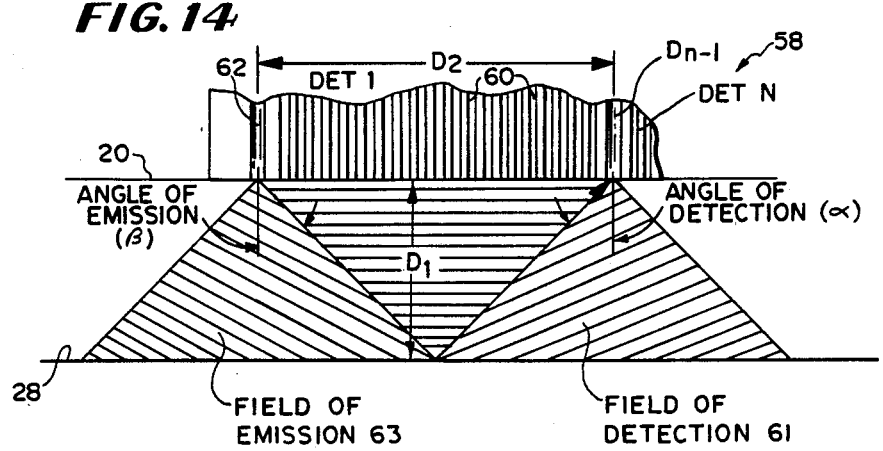
FIG. 14 is a diagrammatic view of the distance measurement operation of the transducer device shown in FIG. 13.
Figure 15:
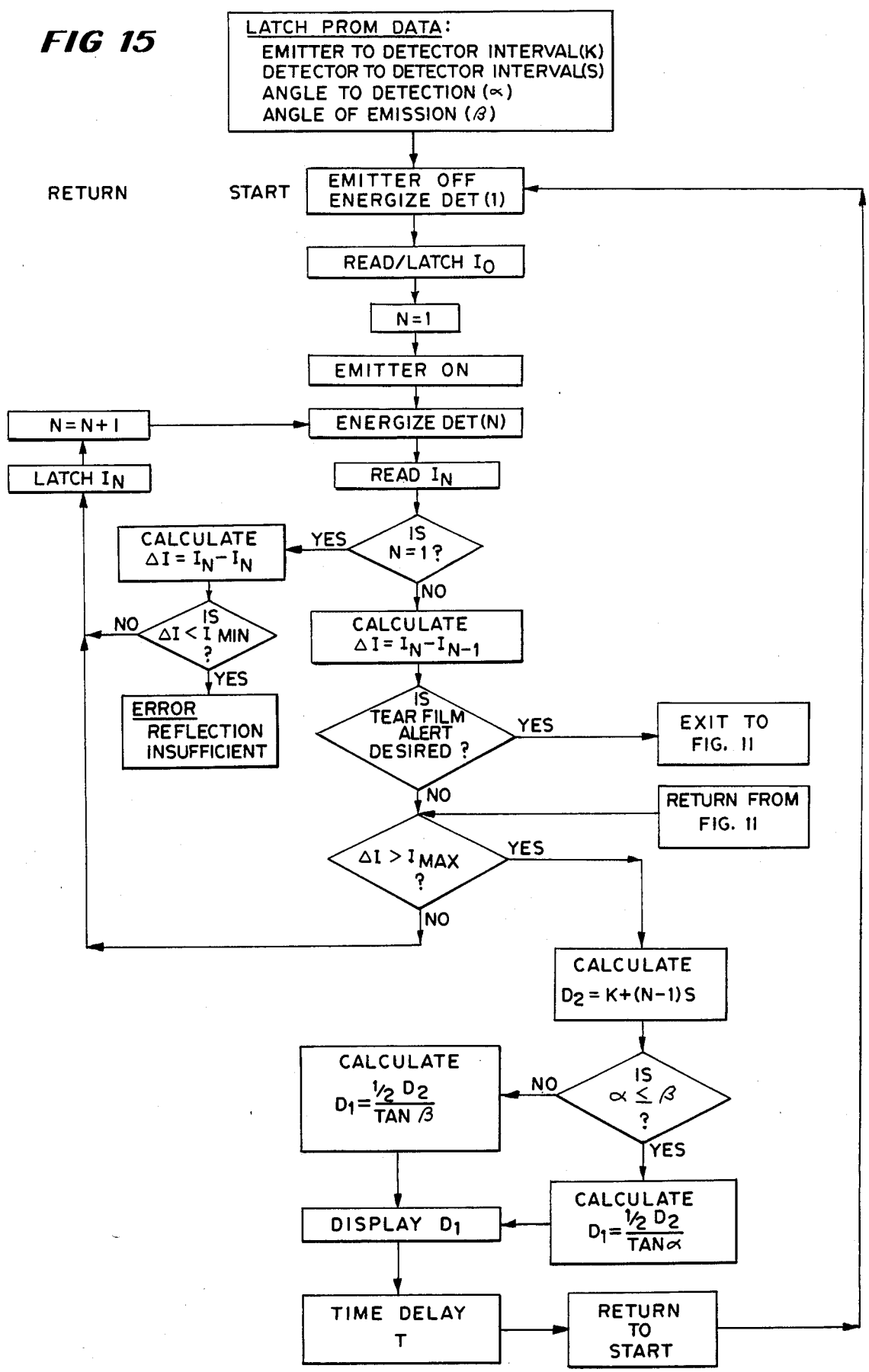
FIG. 15 is a logic chart showing a sequence of the operation of the transducer device and system shown in FIGS. 13 and 14 in deriving a distance measurement.

An alternate embodiment of the transducer device 26 is shown in FIGS. 13 to 15. In this embodiment, each measurement unit 58 comprises a single emitter 62 which is used in combination with a plurality if detectors 60.

The component parts of the transducer device 26 in this arrangement are identical to those employed in the first described embodiment (shown in FIG. 4). Common reference numerals will thus be used.

In the arrangement shown in FIG. 13, each emitter 62 includes a light emitting diode 74 coupled via an optical fiber 72 with a diode driver circuit 76. Also in this arrangement, each detector 60 includes an optical fiber 66 coupled with a phototransistor 68 which itself is coupled to an analog-to-digital converter 70, as before described with respect to the first embodiment. The detectors 60 are spaced by a constant known interval S. The emitter 62 and the first detector 60 are spaced by a known interval K.

As shown in FIG. 14, for each measurement unit 58, and as before described with respect to the first embodiment, each detector 60 has a field of detection 61 with a known angle of detection ($\beta$ in FIG. 12), and the emitter 62 has a field of emission 63 with a known angle of emission ($\alpha$ in FIG. 12).

The control logic associated with the operation of this embodiment is shown in FIG. 15. In most respects, it follows the control logic shown in FIG. 6, except that, in FIG. 15, the detectors 60 are sequenced in a progression away from the emitter 62, and not vice versa, as occurs in FIG. 6.

In FIG. 14, one measurement unit 58 is shown in its operative position in contact with the epithelium layer 20. At the beginning of the sequence (as shown in FIG. 15), the emitter 62 is turned off and the detector 62 (DET 1 in FIGS. 14 and 15) closest to the emitter 62 is energized. The first circuit means 32 reads the digital number present at this detector (Io in FIG. 15), which is the base intensity of any ambient light being reflected off the endothelium layer 28. This digital number $I_0$ latched for future use.

The emitter 62 is now energized, and the digital number now present at the first detector DET 1 is read. This digital number $I_N$ represents the intensity of light reflected by the endothelium layer 28 due to the emitter 62. This digital number $I_N$ is compared to the first obtained digital number $I_0$.

If the difference $\Delta I$ between $I_N$ and $I_0$ does not exceed a predetermined minimum amount ($I_{MIN}$ in FIG. 15), and error signal results, as before explained, illuminating by the "Reflection Insufficient" display 78 on the control module 14 (see FIG. 1).

If the difference $\Delta I$ exceeds the predetermined minimum amount $I_{MIN}$, the digital number $I_N$ latched. The first detector DET 1 is turned off, and the next detector DET 2 is energized. The digital number at the detector DET 2 is read and compared to the most recently latched digital number. If the reflected light still falls within the field of view of the second detector DET 2, the new digital number should be essentially the same as the most previous digital number. If so, the new digital number is latched.

In this embodiment, the first circuit 32 means continues to individually energize the detectors 60, sequentially beginning with the one closest to the emitter and proceeding toward the detector farthest away. This sequence continues until the difference between the digital numbers associated with two sucessively energized detectors 60 exceeds a predetermined maximum amount ($I_{MAX}$ in FIG. 15).

The circuit 32 calculates the distance (D2) from the emitter 672 to the detector and derives $\overline{D1}$ according to formula (3) heretofore described.

The embodiment shown in FIGS. 13, 14, and 15, can be used in the same manner to calculate an average $\overline{D1}$, to position the instrument relative to the plane of the endothelium, and to sense the lack of contact between the operative face and the epithelium, all in the same fashion as described for the first embodiment.

Figure 16:
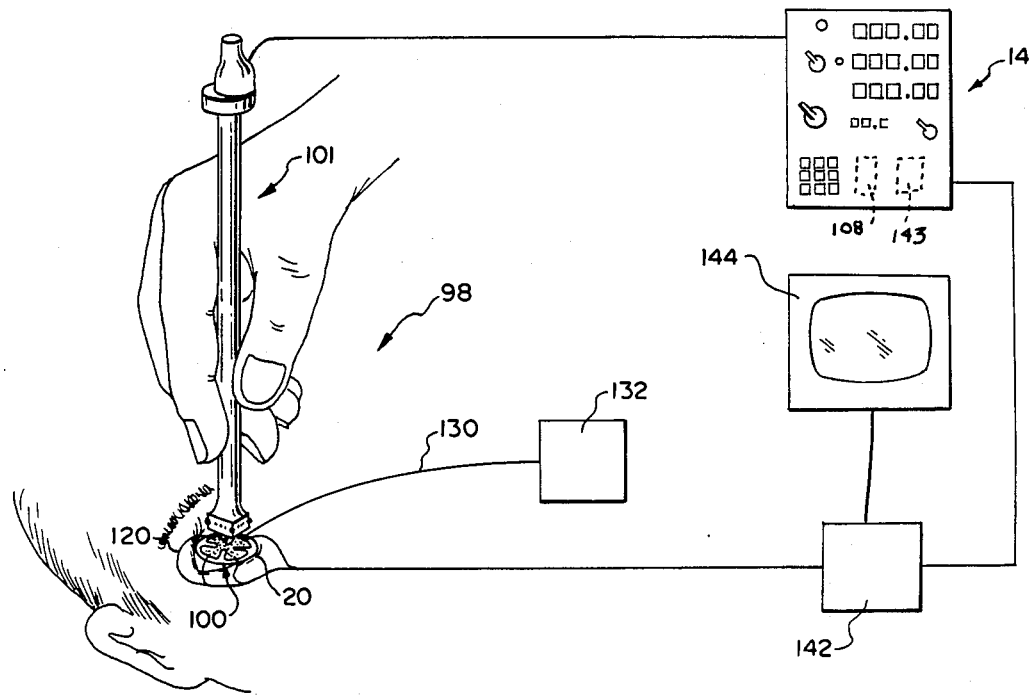
FIG. 16 is a topographical mapping, depth measurement, and cutting system which embodies the features of the invention.

Attention is now directed to FIG. 16 and to the topographical measurement aspect of the invention. There, another system 98 for performing either manual or automated keratotomy is shown. The system 98 includes a topographical mapping template 100 and a probe 101.

Figure 17:
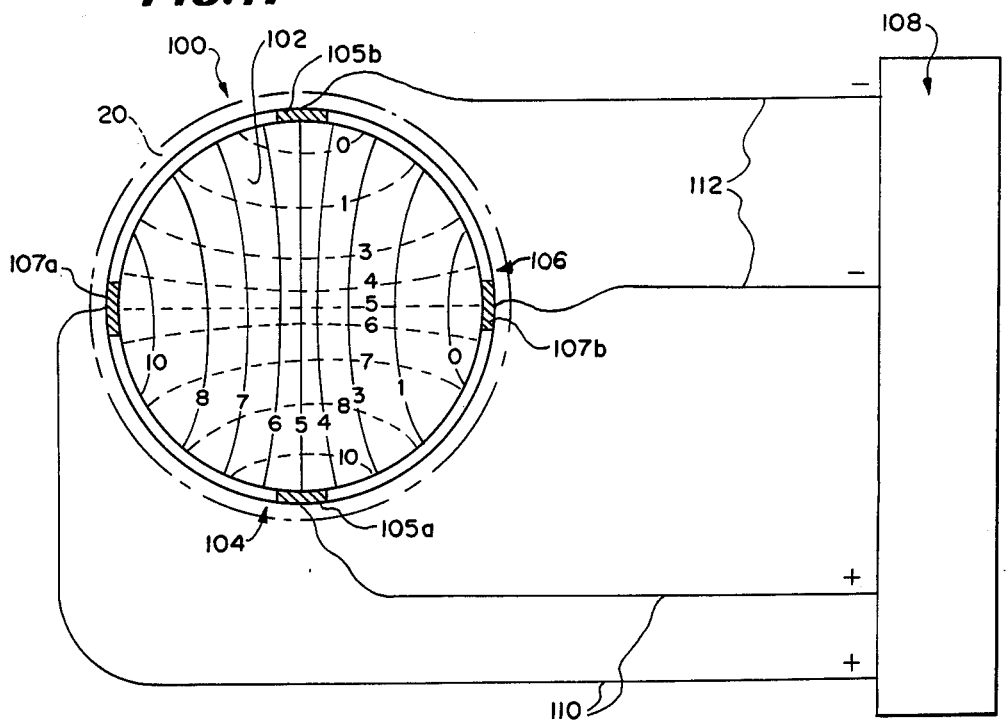
FIG. 17 is a top view of the template associated with the system shown in FIG. 16 showing the voltage gradients established by the template.

As shown in FIG. 17, the template 100 peripherally defines an interior area 102. The template 100 is attachable to the epithelium layer 20 of the cornea (see also FIG. 16). The template 100 is thus shaped as an annular hoop to closely conform to the shape of the cornea.

The template 100 includes first means 104 for generating a first known voltage gradient across the epithelium layer 20, which is an electrical conducting surface. The first gradient is shown in dotted lines in FIG. 17. The template also includes second means 106 for generating a second known voltage gradient across the epithelium layer 20. The second gradient, which is shown in full lines in FIG. 17, extends in a non-parallel relationship with the first gradient, thereby establishing a topographical voltage grid on the surface of the cornea.

In the illustrated embodiment (see FIG. 17), the first and second generating means 104 and 106 take the form of diametrically oppositely spaced pairs of electrical contacts, respectively 105a and b and 107a and b. Each of these contacts 105a/b and 107a/b touch the epithelium layer 20 when the template 100 is in position. As shown in FIG. 17, contacts 105a and 107a are connected to the electrically positive side of the control circuit means 108 by electrical wires 110. Contacts 105b and 107a are connected to the electrically negative side of the circuit means 108 by electrical wires 112. The control circuit means 108 can be housed within the control module 14, as shown in FIG. 16.

In accordance with the invention, the control circuit means 108 alternately energizes the first and second generating means 104 and 106.

When the circuit means 108 energizes the first generating means 104, a small electrical current flows into the contact 105a. The current will flow across the epithelium layer 20 toward contact 105b. Because of the cornea's intrinsic resistance to electricity, the first voltage gradient will develop.

In FIG. 17, the first voltage gradient consists of measurable lines of equal voltages (shown in dotted lines) which extend between the contacts 105a and 105b, with the voltage present on the epithelium later 20 decreasing along these lines from the contact 105a in the direction of the contact 105b. This decrease is shown diagrammatically in FIG. 17 as beginning with an arbitrary value 10 near contact 105a, and successively decreasing to an arbitrary value 0 near contact 105b. The particular value of the voltage gradients will vary according to the current applied.

When the circuit means 108 energizes the second generating means 106, a small electrical current will flow from contact 107a toward contact 107b, creating the second voltage gradient (shown in full lines in FIG. 17) in the same manner as the first voltage gradient.

Figure 18:
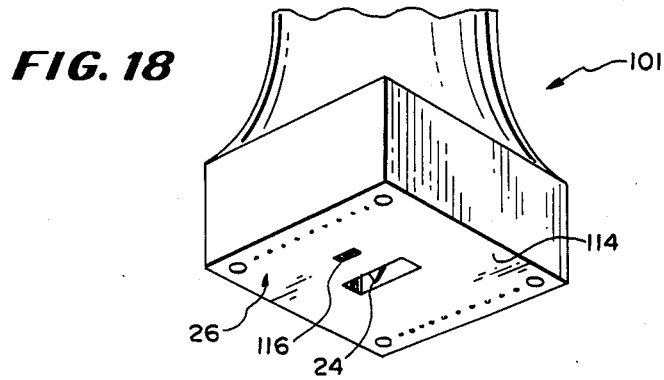
FIG. 18 is an end view of the probe associated with the system shown in FIG. 16.

As shown in FIG. 18, the probe 101 includes an operative face 114 which, in use, is selectively positioned within the template 100 on the epithelium layer 20 (see FIG. 16). The probe 101 includes means 116 on its operative face 114 for sensing the particular voltage present at the epithelium layer 20 where the operative face 112 is positioned. The means 116 can take the form of a patch of electrical conducting material which is elctrically interconnected with voltage sensing circuit means 143 housed within the control module 14, as shown in FIG. 16.

By alternately energizing the first and second generating means 104 and 106, and by each time sensing the voltage present at the probe, the location of the probe 101 relative to each of the first and second voltage gradients can be accurately determined by the voltage sensing circuit means 143 within the control module 14.

Figure 19:
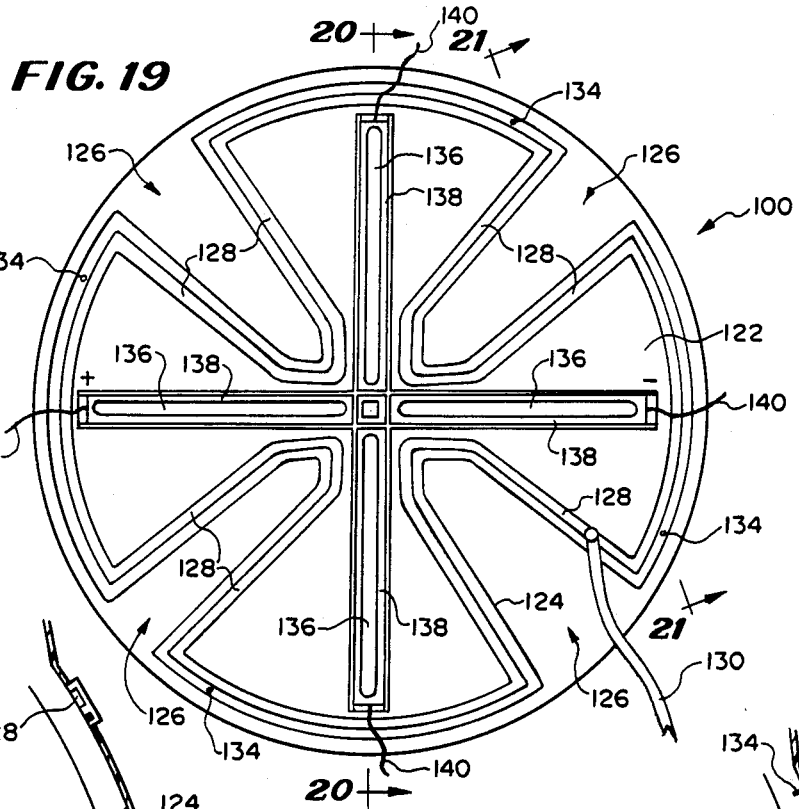
FIG. 19 is a top view of another template which can be used in association with the system shown in FIG. 16.
Figure 20:
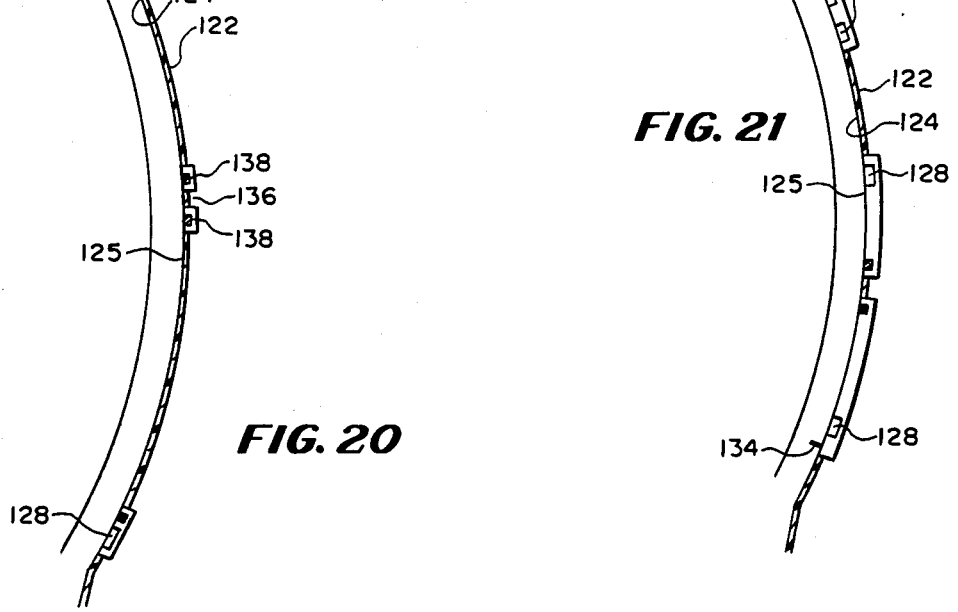
FIG. 20 is a section view of the template taken generally along line 20—20 in FIG. 19.
Figure 21:
FIG. 21 is a section view of the template taken generally along line 21—21 in FIG. 19.

An alternate, preferred embodiment of the template 100 is shown in FIGS. 19 to 21. In this embodiment, the template 100 is made from an elastic material. The body has an undersurface 124 (see FIG. 20 and 21) sized and curved to approximate the contour of the average human cornea 125. The body 122 includes four notches 126 to give it flexibility and the ability to readily conform to the contour of the cornea 125.

The template 100 further includes a vacuum chamber 128 formed in the body 122 around the contour of the notches 126. The chamber 128 communicates with a conduit 130 which, in turn, is attachable to an external vacuum source 132 (see FIG. 16).

When a vacuum is applied to the vacuum chamber 128, the template 100 is secured to the cornea 125.

If desired, small steel pins 134 (see FIG. 21) can depend from the underbody 124 of the template 100. These pins 134 partially penetrate the cornea 125 to further secure the template 100 in place.

The template 100 further includes four slots 136 arranged at ninety degree intervals on the template body 122. The slots 126 are bracketed by bars 138 having a low electrical resistance. Electricity is transmitted to each bar 138 by wires 140. As shown in FIG. 20, when the template 100 is secured on the cornea, the undersurface of each resistor bar 138 contacts the epithelium layer of the cornea 135.

When a small electrical current passes through each of the resistor bars 138, a linear voltage drop occurs along the long dimension of the bar 13. This voltage drop is transmitted to the underlying corneal surface and creates the heretofore described first and second voltage gradients.

Thus the voltage on the surface of the cornea underlying each slot 116 varies, being largest at edge of the bar 138 on the electrically positive side of the circuit and becoming progressively smaller in the direction of the electrically negative side of the circuit.

In use, electrical current is passed, first, along one pair of diametrically opposite slots 136 and, then, along the other pair. Alternately, different voltage drops can be developed along each bar 138 by using bars 138 of different resistance and/or by applying different amount of electrical current to the bars 138.

Also in the preferred embodiment (see FIG. 18), the probe 101 includes on its operative face 114 the transducer device 26 as heretofore described. It should be appreciated, however, that the probe 101 can employ a transducer device of a different construction and operation.

The probe 101 also preferably includes the movable cutting blade 24 as heretofore described.

In this arrangement, the probe 101 is moved in sequence down each of the slots 136 as electricity is being applied to the associated bar 138. The voltage encountered along the slot 136 is continuously monitored by the probe 101 in the manner heretofore described, while the associated transducer device 26 simultaneously operation to provide the corneal thickness data. The position of the probe 101, based upon voltage reading encountered, is combined with each of the thickness measurements taken, using microprocessor control circuit means 142 (see FIG. 16).

When continuously displayed on an associated video monitor 144, the result is a topographical map of the cornea, showing changes of corneal thickness along the various meridians established by the slots 136 in the template 100.

Meanwhile, the cutting edge 24 of the probe 101 can be automatically controlled by the second circuit means 36 (as heretofore described) as the probe 101 moves along the slots 136. An incision having a depth which is a uniform percentage of corneal thickness, thereby resulting in a uniform uncut thickness of corneal depth adjacent to the endothelium layer, is thus made along the slot 136, even as corneal thickness changes.

It should be appreciated that, instead of using a blade 22 to cut the cornea, the incision can be made using a laser beam or other instrument capable of making incisions of precise depths. The transducer device 26 as heretofore described can be used to control the depth of incision made by the laser or other instrument, and the instrument 12 or probe 101 can incorporate in a hand-held device both the transducer device 26 and the laser source, just as the transducer device 26 and blade 22 were incorporated.

It should be appreciated that, although the topographical mapping system has been described in the particular context of a keratotomy procedure, the mapping system can be used in a diverse number of environments where accurate topographical information is desired. The particular surface on which the template is attached can be instrinsically conductive of electricity, to thereby develop the desired gradients, or the surface can be made electrically conductive by applying an electrically conductive fluid or material to the surface.

Various features of the invention are set forth in the following claims.

We claim:

1. A system for measuring the distance between a reference face and an energy reflecting surface comprising
   at least one measurement unit including
      means positioned adjacent to the reference face for emitting within a known angle of emission a cone of energy toward the reflecting face, and
      means positioned on the reference face for detecting within a known angle of detection a cone of energy reflected from the reflecting face toward the reference face,
   means for changing the lateral spacing between said emitter means and said detector means from a first interval, in which said emitter means and said detector means are generally adjacently spaced, to successive intervals, each increasing the lateral spacing between said emitter means and said detector means,
   means for measuring the intensity of said cone of reflected energy detected by said detector means at said first interval and each of said successive intervals until the drop in intensity between two successive intervals exceeds a predetermined value,
   means for determining the lateral distance between said emitter means and said detector means at which said drop in intensity occurs, and
   means for calculating the distance between the reference face an the reflecting surface to the following formula:

$$D1 = \frac{\frac{1}{2} D2}{\tan \phi}$$

wherein D1 is the distance between the reference face and the reflecting surface,
   wherein D2 is said lateral distance, and
   wherein $\phi$ us the smaller of said angle of emission and said angle of detection.

2. A system according to claim 1 wherein each of said measurement units includes one detector means in association with a plurality of emitter means.

3. A system according to claim 1 wherein each of said measurement units including one emitter means in association with a plurality of detector means.

4. A system according to claim 1 wherein at least two of said measurement units are present,
   and further including means for calculating an average distance between the reference face and the reflecting surface by adding the distance between the reference face and the reflecting surface at each of said measurement units and dividing by the number of said measurement units.

5. A system according to claim 4 and further including means for comparing the distance at a selected one of said measurement units with said average distance to determined the relationship between the reference face with the reflecting surface.

6. A system according to claim 1 and further including means for detecting when a drop of intensity occurs which is less than said predetermined value and greater than a predetermined intermediate value and for generating a signal.

7. A system according to claim 1 wherein said energy used is light energy.

8. A system according to claim 1 and further including means for generating a control signal based upon the distance between the reference face and the reflecting surface.

9. A corneal depth measurement instrument comprising:
   a housing having an operative face which, in use, is positioned adjacent to the epithelium layer of the cornea, and
   transducer means on said operative face comprising at least one measurement unit including
      means positioned adjacent to the epithelium layer for emitting within a known angle of emission a cone of energy toward the endothelium layer, and
      means positioned on the epithelium layer for detecting within a known angle of detection a cone of energy reflected from the endothelium layer toward the epithelium layer,
   means for changing the lateral spacing between said emitter means and said detector means from a first interval, in which said emitter means and said detector means are generallly adjacently spaced, to successive intervals, each increasing the lateral spacing between said emitter means and said detector means,
   means for measuring the intensity of said cone of reflected energy detected by said detector means at said first interval and each of said successive intervals until the drop in intensity between two successive intervals exceeds a predetermined value,
   means for determining the lateral distance between said emitter means and said detector means at which said drop in intensity occurs, and
   means for calculating the distance between the epithelium layer and the endothelium layer according to the following formula:

$$D1 = \frac{\frac{1}{2} D2}{\tan \phi}$$

wherein D1 is the distance between the epithelium layer and the endothelium layer,
   wherein D2 is said lateral distance, and
   wherein $\phi$ is the smaller of said of emission and said angle of detection.

10. An instrument as defined in claim 9 wherein each of said measurement units includes one detector means in association with a plurality of emitter means.

11. An instrument as defined in claim 9 wherein each of said measurement units including one emitter means in association with a plurality of detector means.

12. An instrument as defined in claim 9
Wherein at least two of said measurement units are present,
and further including means for calculating an average distance between the epithelium layer and the endothelium layer by adding the distance between the epithelium layer and the endothelium layer at each of said measurement units and dividing by the number of said measurement units.

13. An instrument as defined in claim 9
and further including means for comparing the distance at a selected one of said measurement units with said average distance to determined the relationship between the epithelium layer with the endothelium layer.

14. An instrument as defined in claim 9
and further including means for detecting when a drop of intensity occurs which is less than said predetermined value and greater than a predetermined intermediate value and for generating a signal.

15. An instrument as defined in claim 9
wherein said energy used is light energy.

16. An instrument as defined in claim 9
and further including means for generating a control signal based upon the distance between the epithelium layer and the endothelium layer calculated by said transducer means.

17. An instrument as defined in claim 16
and further including an operator readable display operative in response to said control signal.

18. An instrument as defined in claim 16 and further including
cutting means carried by said housing operative in response to said control signal to obtain a desired depth of incision into the cornea to perform keratomy.

19. A topographical mapping system for locating a position on an electrical conducting surface or a surface that has been made electrically conductive for performing radial keratotomy and the like, said system comprising
a template peripherally defining an interior area and being sized to be adapted to be fitted upon the cornea of the eye and thus being attachable on the energy conducting surface to peripherally surround an area thereof, said template including
first means for generating a first known voltage gradient across the area surrounded by said template, and
second means for generating a second known voltage gradient across the area surrounded by said template, said second voltage gradient being non-parallel to said first voltage gradient,
a probe capable of being selectively positioned within the area surrounded by said template, said probe including means for sensing the voltage present at the energy conducting surface where said probe is positioned, and
system control means comprising
means for alternately energizing said first and second generating means on said template, and
means for creating an operator readable display of the voltage sensed by said probed sensing means, whereby the position of the probe relative to said first and second voltage gradient established on the electrical conducting surface surrounded by said template can be determined.

20. A system as defined in claim 19
wherein said probe further includes means for measuring the distance between the electrical conducting surface and an energy reflecting surface underlying the electrical conducting surface.

21. A system as defined in claim 19
wherein said prove further includes means for making an incision into the electrical conducting surface.

22. A system as defined in claim 21
wherein said probe further includes means for measuring the distance between the electrical conducting surface and an energy reflecting surface underlying the electrical conducting surface to control the depth of said incision.

23. A system as defined in claim 19
wherein said first generating means and said second generating means are spaced along the periphery of said interior area by about ninety degrees.

24. A system as defined in claim 19
wherein at least one of said first and second generating means includes means defining a track along which said probe is movable and along which a linear voltage drop occurs to generate said associated voltage gradient.

25. A system as defined in claim 19
wherein said template is releasably attachable to the electrical conducting surface.

26. A corneal topographical mapping and cutting system comprising
a topographical mapping template peripherally defining an area and being releasably attachable on the epithelium layer of the cornea, said template including
first means for generating a first known voltage gradient across the epithelium layer, and
second means for generating a second known voltage gradient across the eputhelium layer in a non-parallel relationship to said first voltage gradient,
a corneal depth measurement and cutting instrument capable of being selectively positioned on the cornea surrounded by said template and comprising
a housing having an operative face which, in use, is positioned adjacent to the epithelium layer of the cornea,
means for making an incision into the cornea;
transducer means on said operative face operative, when said operative face is adjacent to the epithelium layer, for emitting energy upon the endothelium layer and for calculating the distance between the epithelium and the endothelium layers based upon the intensity detected, and
means on said operative face operative, when said operative face is adjacent to the epithelium layer, for sensing the voltage present at the epithelium layer where said operative face is positioned, and
system control means comprising
means for alternately energizing said first and second generating means on said template,
means for creating an operator readable display of the voltage sensed by said voltage sensing means, thereby indicating for each of said positions the position of said operative face of said instrument on the cornea, means for creating an operator readable display of the distance calculated by said transducer means, thereby indicating the depth of the cornea under said operative face, and means for operating said incision means to obtain a desired depth of incision into the cornea.

27. A system as defined in claim 26
wherein said system control means includes means for generating a control signal based upon the distance calculated by said transducer means, and
wherein said means for operating said incision means is operative in response to said control signal.

28. A system as defined in claim 26
wherein said transducer means comprises at least one measurement unit including
means positioned adjacent to the epithelium layer for emitting within a known angle of emission a cone of energy toward the endothelium layer, and
means positioned on the epithelium layer for detecting within a known angle of detection a cone of energy reflected from the endothelium layer toward the epithelium layer,
means for changing the lateral spacing between said emitter means and said detector means from a first interval, in which said emitter means and said detector means are generally adjacently spaced, to successive intervals, each increasing the lateral spacing between said emitter means and said detector means,
means for measuring the intensity of said cone of reflected energy detected by said detector means at said first interval and each of said successive intervals until the drop in intensity between two successive intervals exceeds a predetermined value,
means for determining the lateral distance between said emitter means and said detector means at which said drop in intensity occurs, and
means for calculating the distance between the epithelium layer and the endothelium layer according to the following formula:

$$D1 = \frac{\frac{1}{2} D2}{\tan \phi}$$

wherein D1 is the distance between the epithelium layer and the endothelium layer,
wherein D2 is said lateral distance, and
wherein $\phi$ is the smaller of said angle of emission and said angle of detection.

29. A system as defined in claim 26
wherein said first generating means and said second generating means are spaced along the periphery of said interior area by about ninety degrees.

30. A system as defined in claim 26
wherein at least one of said first and second generating means includes means defining a track along which said probe is movable and along which a linear voltage drop occurs to generate said associated voltage gradient.

* * * * *